United States Patent [19]
McClure

[11] Patent Number: 5,173,594
[45] Date of Patent: Dec. 22, 1992

[54] SYSTEM FOR PRINTING PERSONALIZED CHARGE-CARD SERVICE RECEIPTS AT REMOTE LOCATIONS

[75] Inventor: Dana W. McClure, El Toro, Calif.

[73] Assignee: GTE Cellular Communications Corporation, Irvine, Calif.

[21] Appl. No.: 767,542

[22] Filed: Sep. 27, 1991

Related U.S. Application Data

[63] Continuation of Ser. No. 290,063, Dec. 27, 1988, abandoned.

[51] Int. Cl.⁵ ............................................. G06F 15/21
[52] U.S. Cl. .................................... 235/380; 235/375; 235/432; 364/400; 379/116; 379/91
[58] Field of Search ............... 235/375, 380, 381, 432; 902/36; 364/400, 406, 408, 401; 340/825.33, 825.35; 379/56, 58, 59, 91, 100, 114, 116, 119, 144

[56] References Cited

U.S. PATENT DOCUMENTS

| | | | |
|---|---|---|---|
| 4,439,636 | 3/1984 | Newkirk et al. | 379/91 |
| 4,777,646 | 10/1988 | Harris | 379/91 |
| 4,860,341 | 8/1989 | D'Avello et al. | 379/91 |
| 4,918,723 | 4/1990 | Igguben et al. | 379/91 |
| 4,926,325 | 5/1990 | Benton et al. | 340/825.33 |

Primary Examiner—Robert Weinhardt
Attorney, Agent, or Firm—Young & Thompson

[57] ABSTRACT

A receipt generator which produces written receipts at locations remote to the location of use for a conventional charge-card activated system is disclosed. The charge-card activated system provides a telecommunications service and maintains billing records which are supplied at predetermined intervals, such as daily, to a receipt transmission computer. The receipt transmission computer communicates with a personal profile database that associates charge-card numbers with phone numbers assigned to the remote locations. Printing devices, such as facsimile machines, couple to phone lines at these remote locations. The receipt transmission computer identifies, through an examination of charge-card identifiers, particular ones of the billing records for which personal profile database entries exist. The receipt transmission computer then formats a text file for such records. For each of such records, this text file includes transaction parameters describing use of the service within the previous predetermined interval. Attempts are then made to send the text file to the phone number recorded in the personal profile database. When a successful attempt occurs, the written receipt is printed at the printing device in the remote location.

9 Claims, 5 Drawing Sheets

SYSTEM FOR PRINTING PERSONALIZED CHARGE-CARD SERVICE RECEIPTS AT REMOTE LOCATIONS

This application is a continuation of application Ser. No. 07/290,063, filed Dec. 27, 1988, now abandoned.

TECHNICAL FIELD OF THE INVENTION

The present invention relates generally to charge-card activated systems. More specifically, the present invention relates to generating a written receipt for the use of a charge-card activated system soon after the use of the system and at a location remote from the use of the system.

BACKGROUND OF THE INVENTION

Charge-card activated systems provide a service, such as communications, banking, product dispensing, or the like, for a customer. Typically, the customer receives the charge-card activated service through the aid of an automated machine which is equipped with a charge-card reader. The customer must first cause a charge-card to be read by the machine. Numerous conventional charge-cards, including credit, banking and debit cards, are available to the public for use in connection with such charge-card activated services. After reading the charge-card, the system provides the service and debits the customer's charge-card account to reflect charges for the service and/or dispensed product.

In order for the customer to responsibly monitor and control the use of the customer's charge-card accounts, the customer must maintain records of transactions that affect such accounts. Consequently, some charge-card activated systems incorporate a printing device located near the charge-card reader. Such a system typically generates a written receipt, or transaction record, using the printing device. The system presents this receipt to the customer for the customer's use.

While the incorporation of a printer in a charge-card activated system attempts to serve customer needs regarding the monitoring and control of the customer's charge-card accounts, it suffers from many technical drawbacks. For example, the incorporation of a printing device at a remote terminal increases the expense of such a remote terminal. Since a charge-card activated system typically includes a multiplicity of remote terminals, the expense of equipping all remote terminals with a printer makes such a system excessively expensive. In addition, such printer-equipped remote terminals are, in some applications, undesirably large and heavy. Moreover, the printer is typically a low-reliability component of a remote terminal, and the printer significantly deteriorates overall remote terminal reliability.

In addition to the technical problems associated with locating printers in remote terminals, such printers do not completely serve the customer's needs with respect to monitoring and controlling charge-card accounts. The receipt presented to the customer at the remote terminal is typically saved in the customer's personal effects, transported to a storage place where the customer typically keeps like records and receipts, then moved from such personal effects to the storage place. This procedure often breaks down, and such receipts occasionally fail to be placed in storage. Consequently, the customer has difficulty in monitoring and controlling the customer's charge-card accounts when such charge-card activated systems are used.

Due to the above-mentioned problems with locating a printer at a remote terminal, some charge-card activated systems simply refrain from locating a printer at the remote terminal. One example of such a system is an in-flight telephone service system, offered under the servicemark "Airfone" by GTE Airfone Incorporated of Oak Brook, Ill. This system uses charge-card-reader-equipped telephone instruments located within commercial aircraft cabins for remote terminals. In this system, a written statement is periodically mailed to the customer from a central location. This statement itemizes the customer's activity with the service and may be used by the customer to monitor and control the customer's charge-card accounts.

Although the periodic statement technique for providing the customer a written receipt solves many of the above-discussed problems, it nevertheless suffers from its own drawbacks. For example, the customer must wait for up to two months or more to receive a receipt. This delay can be intolerable to those who must complete corporate travel expense records soon after making a business trip and those who frequently utilize such a service so that they cannot recall specific uses after such a delay. In addition, the provided receipt typically omits the type of detail which is required to properly maintain corporate expense records and to permit the customer to recall specific uses of the service.

Consequently, a need exists for a system and method for generating a written receipt for the use of a charge-card activated service so that the written receipt is not presented to the customer at a remote terminal but is presented to the customer soon after use of the service and at a location convenient to the customer.

SUMMARY OF THE INVENTION

Accordingly, it is an advantage of the present invention that a system for generating a written receipt at a location remote from the use of a charge-card activated system is provided.

Another advantage is that the receipt generator of the present invention presents a written receipt to a customer of a charge-card activated system soon after the customer's use of the system.

Yet another advantage is that the present invention is compatible with existing equipment and systems so that it can be implemented inexpensively and without significant modification to the existing equipment and systems.

Still another advantage is that the receipt generator of the present invention utilizes a customer-supplied printing device so that the charge-card activated system does not suffer from the physical size, expense, and reliability problems associated with the location of printing devices at remote terminals.

The above and other advantages of the present invention are carried out in one form by a receipt generator which forms a part of a charge-card activated system. The receipt generator includes a computer. This computer incorporates a data communications network interface and a memory. The memory stores a personal profile database (PPDB), a billing file (BF), and instructions. The PPDB is formed so that it contains a plurality of PPDB records, each of which includes PPDB charge-card and target address data fields. The billing file is formed so that it contains a plurality of BF records, each of which includes a BF charge-card data field and various transaction parameters. The instructions stored in the memory cause the computer to identify a PPDB record in which the PPDB charge-card data field matches the BF charge-card data field of a BF record. The instructions additionally cause the computer to send, out from the interface, a signal generated from data contained in the target address data field of the identified PPDB record. Such a signal may, for example, represent a dialed phone number. In addition, the instructions cause the computer to transmit, out from the interface after sending the signal, the transaction parameters contained in the identified BF record.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
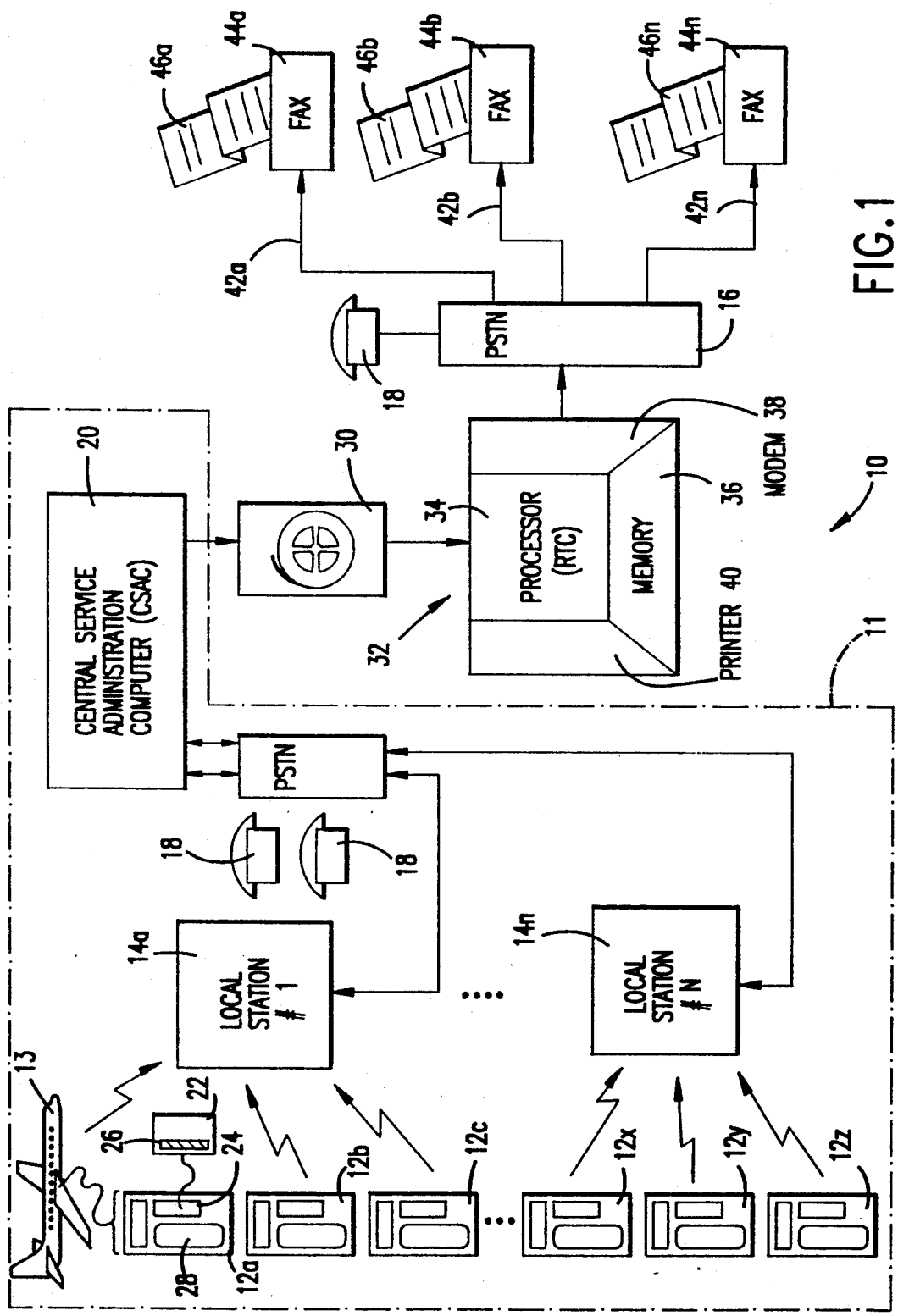
FIG. 1 shows a system level block diagram of the present invention.

FIG. 1 shows a block diagram for a receipt generator 10. In the preferred embodiment, receipt generator 10 incorporates an existing in-flight telephone service system 11. However, those skilled in the art will recognize that receipt generator 10 of the present invention is not limited to use in connection with the in-flight telephone service system but may be used in connection with a wide variety of charge-card activated services and systems.

In-flight telephone service system 11 incorporates charge-card activated telephone instruments 12a, 12b, and 12c within a cabin of an aerial vehicle, such as an airplane 13. Additional telephone instruments 12x, 12y, and 12z are located in other airplanes (not shown). Telephone instruments 12a–12z serve as remote terminals for system 11. In addition, airplane 13 includes an airborne computer unit and a radio transceiver (not shown), through which telephone instruments 12a–12c electromagnetically communicate over a radiocommunications link with one of local, ground stations 14a–14n. Each of local stations 14a–14n includes a radio transceiver, a ground communications computer, and an interface to a switched telecommunications network (not shown).

Local stations 14a–14n are located throughout the continental United States so that at least one of local stations 14a–14n is in radiocommunications with an in-flight airplane 13, regardless of the location of the airplane 13. Consequently, a multiplicity of airplanes 13, each having some of telephone instruments 12a–12z installed therein, may be in contact with one or more of local stations 14a–14n at any given point in time.

Each of local stations 14a–14n couples to the public switching telephone network (PSTN) 16. For purposes of the present invention, PSTN 16 incorporates all components of the vast array of interconnected switches, trunks, satellite links, cellular systems, pay telephone systems, lines and other components which are coupled together to enable a member of the public to place telephone calls to domestic and international telephone numbers. Consequently, a multiplicity of telephone instruments or other telecommunications devices 18 additionally couple to PSTN 16. In-flight telephone service system 11 additionally includes a central service administration computer (CSAC) 20, which couples to the PSTN 16 and which is programmed to control general administration and billing for system 11. The above-discussed components 12 through 20 together represent the major components of system 11 which are incorporated within receipt generator 10 of the present invention.

Operationally, a customer of system 11 inserts a charge-card 22 into a card reader portion 24 of one of telephone instruments 12a–12z. Charge-card 22 represents predetermined ones of the major, conventional credit, debit, and banking cards widely available to the public. Thus, charge-card 22 includes a magnetic strip 26, which is programmed to store charge-card identifiers thereon. Such charge-card identifiers may include a unique charge-card number along with an expiration date and a description of the card type.

The airborne computer and transceiver (not shown) located on airplane 13 then select a particular radio frequency channel to communicate with a specific one of local stations 14a–14n. The selected one of local stations 14a–14n is determined in accordance with its position relative to airplane 13 and the direction of flight for airplane 13. Once this selection has been made, the charge-card identifiers which were read by card reader 24 are transmitted to the selected one of local stations 14a–14n, and a cradle on the selected one of telephone instruments 12a–12z is unlocked so that a cordless handset 28 may be utilized by a customer of system 11 to enter a telephone number. This telephone number is then presented to PSTN 16. In response, PSTN 16 establishes a communications path to the device 18 which was indicated by the telephone number entered by the customer on handset 28. At this point a call has been established.

This occurrence of a call causes the selected one of local stations 14a–14n to record transaction parameters which identify the call and serve as the basis of a call record. Such transaction parameters include data which identify the date and time when the call originated, the duration of the call, the airline from which the call was made, the phone number of the telecommunications device 18 which was called, and the monetary charges for the call. In addition to these transaction parameters, the selected one of local stations 14a–14n records the charge-card identifiers from charge-card 22.

Throughout a predetermined period, which is around 24 hours in the preferred embodiment, the customer may make a plurality of calls using charge-card 22 and system 11. In addition, such a plurality of calls may be routed through a plurality of local stations 14a–14n so that transaction parameters pertaining thereto are recorded throughout the plurality of local stations 14a–14n. Furthermore, a multiplicity of other charge-cards, whether issued to the same customer or to other customers, may be used to make a multiplicity of additional calls through any and all of local stations 14a-14n. Consequently, at the end of this period of time, each of local stations 14a-14n may have recorded a multiplicity of call records, including those charged to a single charge-card 22.

Local stations 14a-14n and CSAC 20 are programmed so that these call records are transferred from each of local stations 14a-14n to CSAC 20 once during the predetermined period. Specifically, in the preferred embodiment CSAC 20 sequentially places calls through PSTN 16 to each of local stations 14a-14n. Of course, for purposes of the present invention, a private or dedicated datalink could alternately reside between one or more of local stations 14a-14n and CSAC 20 to establish data communications therebetween. When data communications have been established, the called one of local stations 14a-14n is instructed to transmit to CSAC 20 all call records recorded therein since the previous transmission to CSAC 20. This transmission process continues for all of local stations 14a-14n.

After all call records from all of local stations 14a-14n have been transferred to CSAC 20, CSAC 20 performs various billing tasks. Such billing tasks include the compiling of all received call records and the debiting of charge-card accounts in accordance with the monetary charges indicated in each call record. In accordance with a predetermined schedule, CSAC 20 generates a billing file (discussed below) on a magnetic tape. This billing file incorporates all call records for system 11 received from all local stations 14a-14n over a preceding predetermined period of time, which is also around 24 hours in the preferred embodiment. In addition, system 11 generates a statement which is mailed to the customers of system 11 at approximately monthly intervals.

With additional reference to FIG. 1, a data communications path 30 is formed between CSAC 20 and a receipt transmission computer (RTC) 32. Data communications channel 30 transmits the above-described billing file from CSAC 20 to RTC 32. In the preferred embodiment, data communications channel 30 simply represents a magnetic tape which is physically transported from CSAC 20 to RTC 32. Thus, receipt generator 10 remains compatible with the existing in-flight telephone service system 11. However, the present invention contemplates the use of alternate data communication channel implementations, such as physically transported disks, communications through PSTN 16, or communications through a dedicated private data network.

In the preferred embodiment, RTC 32 incorporates a processor 34 which is in data communication with a memory 36, a data communications network interface 38, and a printer 40. In the preferred embodiment, RTC 32 is implemented using a conventional personal computer, such as an IBM PC/XT/AT, compatible, or the like. However, those skilled in the art will recognize that nothing prevents RTC 32 from being implemented using other types of computers, such as mainframes, minicomputers, or an array or network of multiple processors or computers in data communication with one another. Additionally, in the preferred embodiment memory 36 may include one or more conventional data storage devices. Such data storage devices include tape units, disk drives, ROM, PROM, RAM, and the like. Moreover, such memory devices may or may not be physically located near processor 34. In the preferred embodiment of the present invention, network interface 38 is provided through the use of a conventional, programmable facsimile modem which may be internally or externally associated with RTC 32. Printer 40 represents a conventional printer of the type often used in connection with personal computers.

Network interface 38 couples to the PSTN 16, discussed above. At a plurality of PSTN phone lines 42a, 42b, ... 42n PSTN 16 couples to a plurality of printing devices 44a, 44b, ... 44n, respectively. In the preferred embodiment, printing devices 44a-44n are conventional facsimile machines. Printing devices 44a-44n are typically utilized by a customer of system 11 in numerous applications not necessarily associated with system 11. They are typically located at or near places which are convenient to such customers, such as the customers' places of business. Thus, printing devices 44a-44n are generally neither owned nor maintained by the provider of system 11, and they tend to be remotely located from telephone instruments 12a-12z. However, each of printing devices 44a-44n couples to, and is in occasional data communication with, RTC 32 through communications paths provided by PSTN 16 and phone lines 42a-42n.

With reference to the operation of RTC 32, RTC 3 utilizes a personal profile database (PPDB), which has been previously compiled using information obtained from customers of system 11 and stored within memory 36. Generally speaking, RTC 32 generally processes the billing file, discussed above, with this PPDB so that sequential electronic transmissions are made from processor 34 through network interface 38 and PSTN 16 to printing devices 44a-44n. These electronic transmissions cause written receipts 46a, 46b, ... 46n to be printed at printing devices 44a-44n, respectively. In the preferred embodiment, such printing typically occurs within 48 hours of a customer's use of the system 11.

Figure 2:
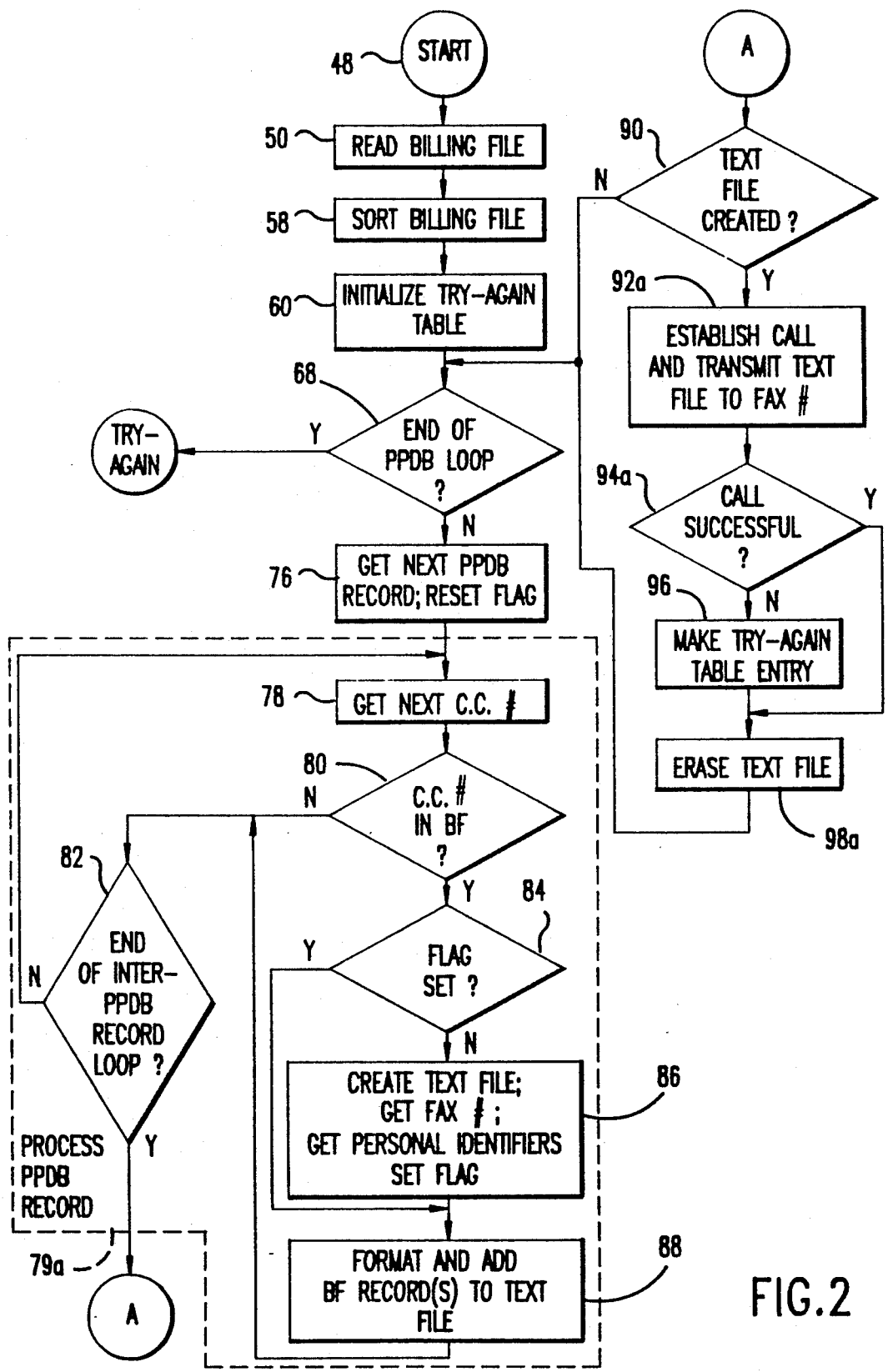
FIG. 2 shows a flow chart of a personal profile database (PPDB) loop portion of tasks performed by a receipt transmission computer (RTC) component of the present invention.
Figure 4:
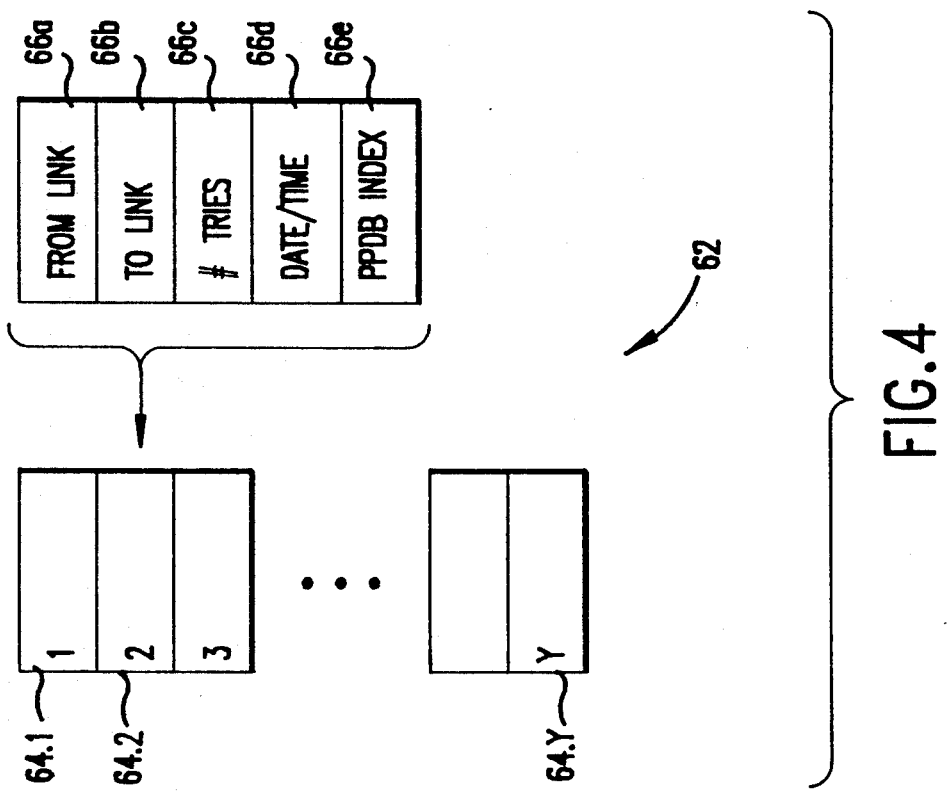
FIG. 4 illustrates data items contained in a try-again table utilized by the present invention.
Figure 3:
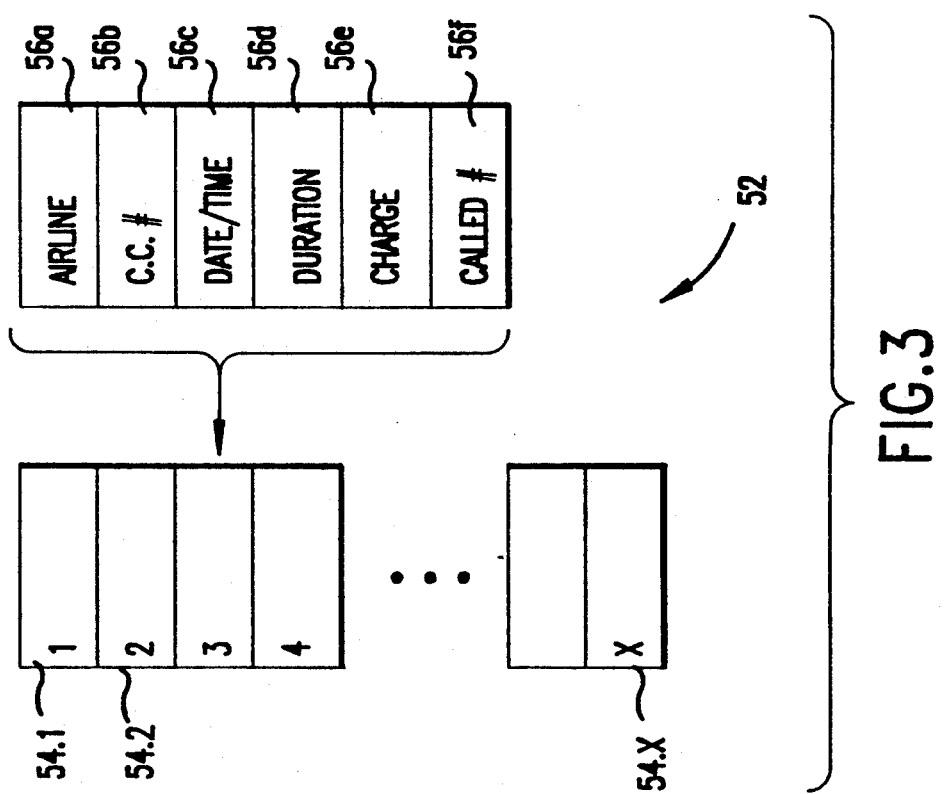
FIG. 3 illustrates data items contained in a billing file (BF) utilized by the present invention.
Figure 5:
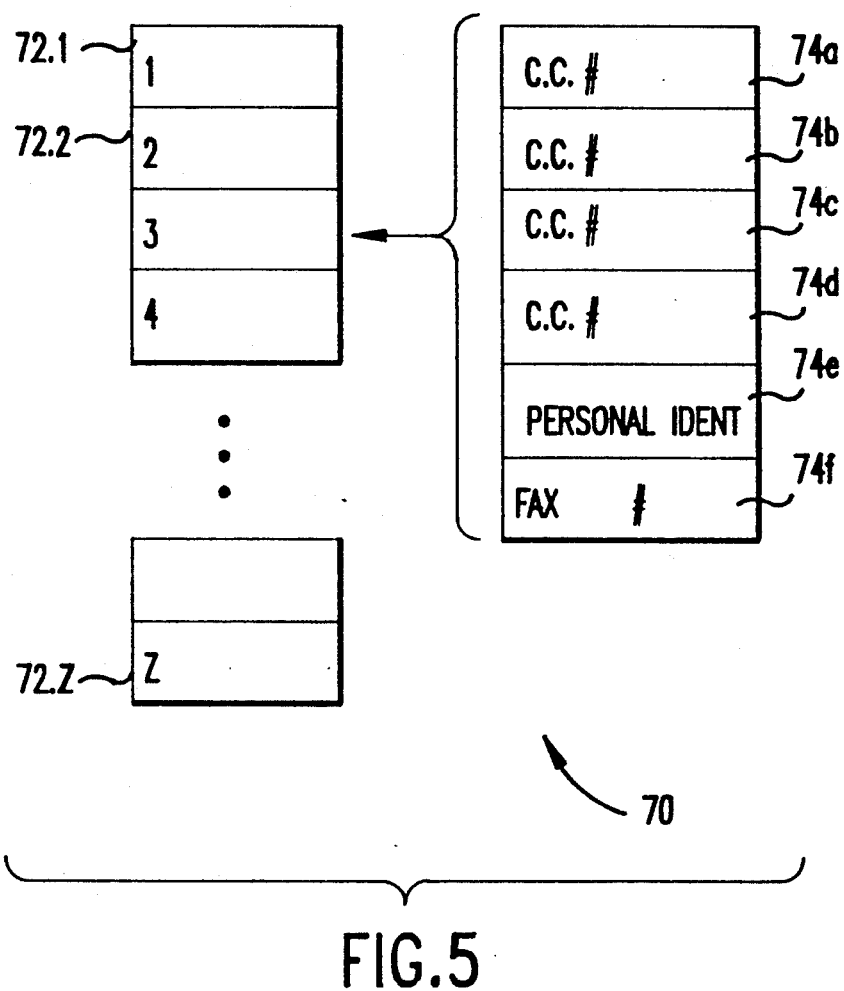
FIG. 5 illustrates data items contained in the PPDB utilized by the present invention.
Figure 6:
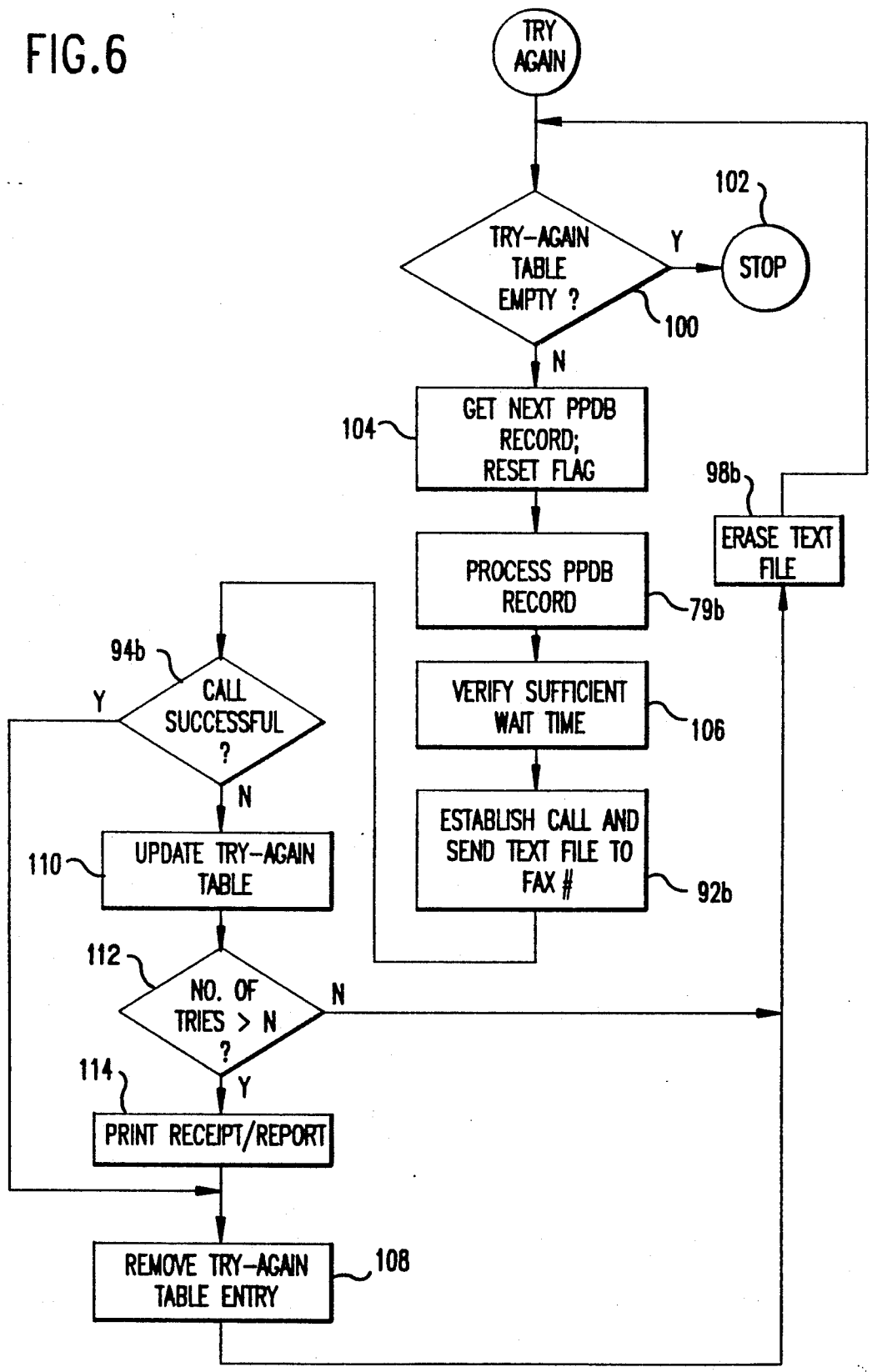
FIG. 6 shows a flow chart of a try-again loop portion of tasks performed by the RTC component of the present invention.

FIGS. 2 through 6 show tasks performed by and data configurations utilized by RTC 32 (see FIG. 1) in accordance with receipt generator 10. FIG. 2 illustrates a "PPDB loop" portion of such tasks, FIGS. 3-5 illustrate data configurations, and FIG. 6 illustrates a "try-again loop" portion of such tasks.

As shown in FIG. 2, the tasks performed by RTC 32 begin at a start block 48. From start block 48, RTC 32 proceeds to a task 50 where it reads the billing file (BF), discussed above and referred to as billing file 52 hereinbelow. In the preferred embodiment, such reading utilizes a magnetic tape device (not shown) to transfer billing file 52 into memory 36 (see FIG. 1). However, those skilled in the art will recognize that billing file 52 may be read using alternate data communications techniques.

FIG. 3 illustrates details of billing file 52. Specifically, billing file 52 includes a multiplicity of BF records 54.1, 54.2, ... 54.x. Each of BF records 54.1-54.x has substantially equivalent data formats, and each of BF records 54.1-54.x includes a plurality of BF data fields 56a, 56b, 56c, 56d, 56e, and 56f. As shown in FIG. 3, data field 56a contains a transaction parameter which describes the airline from which a telephone call was placed using system 11 (see FIG. 1). Data field 56b contains charge-card identifiers that describe the charge-card which was used to activate system 11. As discussed above, such identifiers may advantageously include a unique identifying charge-card number, a description of the type of the charge-card, and the charge-card's expiration date. Data field 56c contains a transaction parameter that identifies the date and time when the call was initiated, and data field 56d contains the duration of the call. Data field 56e contains a transaction parameter that states the monetary charges for the call, and data field 56f contains the phone number which was called.

Referring back to FIG. 2, after billing file 52 (see FIG. 3) has been read by RTC 32, RTC 32 sorts billing file 52, as shown at a task 58. This sorting uses charge-card identifier data field 56b (see FIG. 3) of each BF record 54.1-54.x as a sort key, and arranges BF records 54.1-54.x within billing file 52 so that BF records 54.1-54.x thereafter reside in a predetermined order, such as an ascending or descending charge-card number order. Sorting task 58 is included to save processing time in merging the PPDB, discussed above, with billing file 52. Of course, those skilled in the art will recognize that the sorting of billing file 52 may alternatively be performed by CSAC 20 (see FIG. 1) prior to the reading of billing file 52 at task 50.

After task 58, RTC 32 next performs a task 60 to initialize a try-again table 62, the details of which are illustrated in FIG. 4. As shown in FIG. 4, table 62 includes a multiplicity of table entries 64.1, 64.2, . . . 66b, 66c, 66d, and 66e therein. Data item 66a contains a "FROM link", and data item 66b includes a "TO link." The FROM link and TO link define the locations or addresses of previous and subsequent, respectively, ones of entries 64.1-64.y within try-again table 62. Data item 66c records previously unsuccessful phone call attempts. Data item 66d contains the date and time of a previous unsuccessful call attempt. Data item 66e contains an address, location, index number, or the like, which identifies a unique PPDB record, discussed below. Referring to FIGS. 2 and 4, try-again table 62 is initialized in task 60 by setting a pointer (not shown) to an initial one of entries 64.1-64.y in table 62, and by adjusting the FROM link and TO link data fields of such initial one of entries 64.1-64.y to point to itself.

After task 60, RTC 32 next performs a decision task 68, which detects whether processing is at the end of the PPDB loop. FIG. 5 illustrates details of the PPDB, which is referred to as PPDB 70 hereinbelow. As shown in FIG. 5, PPDB 70 includes a multiplicity of PPDB records 72.1, 72.2, . . . 72.z. Each of PPDB records 72.1-72.z is configured similarly to include data fields 74a, 74b, 74c, 74d, 74e, and 74f. In the preferred embodiment, PPDB data fields 74a-74d include first, second, third, and fourth, respectively, charge-card identifiers. The use of four data fields permits a customer of system 11 (see FIG. 1) to obtain a single one of written receipts 46a-46n (see FIG. 1) regardless of which one or ones of up to four charge-cards the customer may use in activating system 11 during a recording period, As discussed above, the charge-card identifiers may include a unique charge-card number, a description of the type of charge-card, and an expiration date for the charge-card.

PPDB data field 74e contains personal identifiers. The personal identifiers include the name of a customer who has indicated that he might use the charge-cards identified in data fields 74a-74d. In addition, data field 74e may include a mailing address for such a customer. PPDB data field 74f contains a target address which identifies where the customer identified in data field 74e wishes to have his or her written receipt 46a-46n printed. In the preferred embodiment, data field 74f contains a phone number which uniquely defines one of phone lines 42a-42n (see FIG. 1). However, the present invention additionally contemplates the use of alternate, private switching communications networks. Consequently, target address data field 74f may alternately include a different type of data code which uniquely specifies the customer's one of printing devices 44a-44n.

Referring to FIGS. 2 and 5, the PPDB loop illustrated in FIG. 2 generally examines PPDB records 72.1-72.z in PPDB index order. In other words, the PPDB loop first processes PPDB record 72.1, then record 72.2, and so on through record 72.z, without skipping intervening ones of PPDB records 72.1-72.z. Therefore, task 68 determines whether PPDB record 72.z has been processed. If PPDB record 72.z has been processed, program flow then proceeds to the try-again loop, which is discussed below in connection with FIG. 6. However, assuming that the PPDB loop has not yet ended, program flow proceeds to a task 76.

Task 76 reads a selected one of PPDB records 72.1-72.z from PPDB 70. The selected one of PPDB records 72.1-72.z depends on the value of an index pointer (not shown), which increments or decrements once for each one of PPDB records 72.1-72.z. In addition, task 76 resets a flag which is used in subsequent operations.

After task 76, a task 78 obtains charge-card identifiers from one of data fields 74a-74d of the previously selected one of PPDB records 72.1-72.z. For the first time through an inter-PPDB record loop 79a, which completely processes the selected one of PPDB records 72.1-72.z, task 78 obtains charge-card identifiers from data field 74a. For a second time through inter-PPDB record loop 79a, task 78 obtains charge-card identifiers from data field 74b, and so on.

After task 78, RTC 32 performs a decision task 80, in which the charge-card identifiers obtained in task 78 are checked against BF records 54.1-54.x (see FIG. 3) in the sorted billing file 52. The sorting operation performed above in task 58 allows RTC 32 to quickly determine whether or not one of BF records 54.1-54.x has such charge-card identifiers in a data field 56b thereof. In addition, the sorting arranges such BF records 54 so that ones of BF records 54.1-54.x which have the same charge-card identifiers are located together.

If such matching charge-card identifiers are not identified in billing file 52, program flow proceeds to another decision task 82, which detects whether the end of inter-PPDB record loop 79a has been encountered. If not, program flow returns to task 78 where the subsequent one of charge-card identifier data fields 74a through 74d is obtained from the selected one of PPDB records 72.1-72.z (see FIG. 5). However, assuming that a matching BF charge-card identifier data field 56b is identified in task 80, RTC 32 proceeds to a task 84 which examines the flag, previously reset in task 76. If the flag is set, a subsequent task 86 is skipped. However, for a first time through inter-PPDB record loop 79a, task 86 is performed.

During task 86, RTC 32 creates a text file. In addition, task 86 causes RTC 32 to obtain the target address from data field 74f of the selected one of PPDB records 72.1-72.z. Additionally, the personal identifiers contained in data field 74e are obtained during task 86. The contents of data fields 74e and 74f are stored in the text file, and the flag is then set so that task 86 will not be performed again within this execution of inter-PPDB record loop 79a.

After tasks 84 and 86, a task 88 is performed by RTC 32. Task 88 generally formats and adds to the text file all the data contained in the one of BF records 54.1-54.x (see FIG. 3) identified above during task 80. As discussed above, multiple ones of BF records 54.1-54.x may be included in billing file 52 under one set of charge-card identifiers when a customer uses a single charge-card to make multiple calls within the period of time encompassed by billing file 52. All such multiple BF records 54.1-54.x are obtained in task 88 and included in the text file. Data from this or these ones of BF records 54.1-54.x are formatted into a predetermined layout for transmission to a specified one of printing devices 44a-44n (see FIG. 1). Of course, the specified one of printing devices 44a-44n is defined by the data contained in target address data field 74f (see FIG. 5).

In addition, task 88 adds various constant data items to the text file and modifies other data items before including them in the text file. A constant data item is one that is routinely included on all receipts generated by receipt generator 10 (see FIG. 1). For example, one constant data item which may be added to the text file is an indication of the name of the service which is providing the receipt.

In the preferred embodiment, task 88 modifies the charge-card identifiers contained in the matched one of BF records 54.1-54.x (see FIG. 3) during the formatting process. Such modification improves security and discourages unauthorized uses of a charge-card number while still permitting a customer to identify the charge-card. Specifically, task 88 truncates a few digits from the charge-card number, such as the last four digits, and omits an expiration date from the data recorded in the text file. Thus, a customer may still identify that a charge-card number represents the customer's charge-card, but others who may observe this number will not be able to make an unauthorized use of the charge-card account.

After task 88, RTC 32 proceeds to task 82 where a determination is made concerning whether the end of inter-PPDB record loop 79a has arrived. If this condition is not met, then RTC 32 again performs the above-mentioned tasks 78, 80, 82, 84, and 88. Thus, all BF records 54.1-54.x (see FIG. 3) which are identified as matching one of the charge-card identifiers 74a-74d (see FIG. 5) in the selected one of PPDB records 72.1-72.z currently being processed by inter-PPDB record loop 79a are included in the text file. Eventually, task 82 determines that the end of inter-PPDB record loop 79a has arrived, and program flow proceeds to a decision task 90.

Decision task 90 examines whether or not a text file was created above. When one of PPDB records 72.1-72.z (see FIG. 5) describes a customer who has not utilized system 11 (see FIG. 1) within the reporting period encompassed by billing file 52 (see FIG. 3), no matches will have been identified in task 80 above, and the text file will not have been created. Consequently, in this situation program flow returns to decision task 68 so that a subsequent iteration of the PPDB loop may be performed to process the next one of PPDB records 72.1-72.z (see FIG. 5). However, if task 90 detects that the text file was created, program flow proceeds to a task 92a.

Task 92a utilizes network interface 38 (see FIG. 1), which in the preferred embodiment is a conventional programmable facsimile modem, to establish a communications path through PSTN 16 (see FIG. 1) to the phone number previously recorded in the text file during task 86. The call is attempted by sending PSTN-compatible signals which are generated based upon this phone number. Such signals instruct PSTN 16 to form a communications path to the selected phone number. If this call is successfully established, then the text file is transmitted to such a phone number in task 92a. The transmission of the text file to such a phone number causes the selected one of printing devices 44a-44n (see FIG. 1) to generate a written receipt for the use of system 11, and the written receipt includes the transaction parameters discussed above in connection with FIG. 3.

After task 92a, a decision task 94a examines whether the attempted call in task 92a was successful. Of course, the present invention intends that such a call should be successful. However, those skilled in the art will recognize that the phone number may be busy, may not be answered, or a compatible printing device may not be connected to PSTN 16 (see FIG. 1) when the call is attempted during task 92a. If the call was successful, a task 96 is skipped and the text file is erased in a task 98a. However, if the call was not successful, task 96 makes one of try-again table entries 64.1-64.y (see FIG. 4) before program flow proceeds to task 98a.

Referring to FIG. 4, task 96 makes this one of try-again table entries 64.1-64.y by forming a FROM link 66a which points to the address of a previous one of entries 64 1-64.y and forming a TO link 66b which points to a number-of-tries data field 66c is set to an initial value, such as zero, and a date/time stamp is entered in data field 66d. This date/time stamp identifies the approximate time at which an attempted call was made. Moreover, an index number which uniquely identifies the selected one of PPDB records 72.1-72.z (i.e. 1-z) for which a call attempt was unsuccessful is stored in data field 66e.

Referring back to FIG. 2, after task 98a erases the text file, program flow proceeds back to decision task 68, which examines whether the end of the PPDB loop has occurred. Program flow remains in the above-described PPDB loop until PPDB record 72.z has been processed by the loop. When PPDB record 72.z has been processed, a first pass of the PPDB loop has been completed. Additionally, try-again table 62 has been constructed to identify the ones of PPDB records 72.1-72.z for which: (a) matching ones of BF records 54.1-54.x (see FIG. 3) exist in BF file 52, and (b) the transaction parameters therefor have not yet been successfully transmitted to printing devices 44a-44n (see FIG. 1). Consequently, the processing proceeds to the try-again loop, which is illustrated in FIG. 6, to attempt to resolve entries in try-again table 62.

Upon entry into the try-again loop shown in FIG. 6, RTC 32 initially examines pointers associated with try-again table 62 (see FIG. 4) to determine whether or not try-again table 62 is empty. If try-again table 62 is empty, then all matching records between PPDB 70 (see FIG. 5) and billing file 52 (see FIG. 3) have been processed, and the present invention may stop executing tasks, as shown at a stop block 102. However, assuming that try-again table 62 is not empty, RTC 32 proceeds to a task 104 which is similar to task 76, discussed above in connection with FIG. 2.

In task 104, one of PPDB records 72.1-72.z (see FIG. 5) is obtained, and the flag (discussed above) is reset. However, task 104 differs from task 76 because task 76 obtained the next PPDB record by using the index order of PPDB 70. On the other hand, task 104 obtains the next PPDB record by examining the PPDB index data field 66e (see FIG. 4) of the selected one of try-again table entries 64.1–64.y being processed by this iteration of the try-again loop. This PPDB index points to the one of PPDB records 72.1–72.z which will subsequently be processed in a task 79b.

Task 79b is substantially the same as discussed above in connection with task 79a of FIG. 2, wherein the selected one of PPDB records 72.1–72.z is processed to form a text file which includes all charge-card identifiers and transaction parameters associated with the selected one of PPDB records 72.1–72.z.

After task 79b, RTC 32 performs a task 106 which verifies that a sufficient wait time has transpired before attempting to establish a call in a task 92b. Task 106 utilizes the date/time data field 66d (see FIG. 4) of the selected one of try-again table entries 64.1–64.y to determine when the previous call was attempted. If a sufficient amount of time (for example, 15 minutes) has not yet transpired since the previous call attempt, RTC 32 waits in task 106 until such sufficient time has transpired. If a previous call was unsuccessful due to a busy signal or no answer, chances are extremely small that a subsequent call will be successful if made within only a few seconds of the previous call. Moreover, other records need not be processed because the organization of tasks discussed above dictates that such other records recorded in try-again table 62 will have even shorter wait times associated therewith.

After a sufficient wait time has transpired in task 106, processing proceeds to task 92b, which is substantially the same as task 92a of FIG. 2. Task 92b generally establishes a call through PSTN 16 to send the text file to one of printing devices 44a–44n (see FIG. 1) so that the written receipt may be printed. After task 92b, a task 94b, which is substantially the same as task 94a of FIG. 2, detects whether such a call was successful.

If the call attempt of task 92b was successful, then the one of try-again table entries 64.1–64.y being processed may be removed from try-again table 62, as shown at a task 108. However, if the call was not successful, RTC 32 updates the selected one of try-again table entries 64.1–64.y in a task 110. The updating of the selected one of try-again table entries 64.1–64.y increments or decrements number-of-tries data item 66c and updates date/time data item 66d to indicate the current time.

After task 110, RTC 32 performs a decision task 112, which examines number-of-tries data item 66c of the selected one of entries 64.1–64.y being processed within this iteration of the try-again loop. Data item 66c is examined to see if it contains a number which is greater than a predetermined number (illustrated as N in FIG. 6). If this predetermined number has been exceeded, receipt generator 10 (see FIG. 1) assumes that no call attempts are likely to be successful, and processing proceeds to a task 114. However, if the number of tries is not yet greater than this predetermined number, then processing proceeds to a task 98b, which erases the text file, previously created during task 79b, and then transfers program control back to the top of the try-again loop at task 100.

Assuming that the number of tries contained in data field 66c is greater than the predetermined number, then program control proceeds from task 112 to task 114, where a receipt and/or report is printed locally at printer 40 (see FIG. 1). Alternatively, the present invention contemplates the printing of a receipt in task 114 at a dedicated facsimile machine. Receipt generator 10 may anticipate no problems in placing a call to such a dedicated facsimile machine. This printed receipt, whether at printer 40 or at a dedicated facsimile machine, may subsequently be mailed to the customer. In addition, task 114 may advantageously make a report of the unsuccessful call so that future maintenance actions may be taken.

After task 114, processing proceeds to task 108, which removes the selected one of try-again table entries 64.1–64.y (see FIG. 4) for this iteration of the try-again loop so that no more calls are placed to the phone number of the selected one of PPDB records 72.1–72.z (see FIG. 5). This try-again table entry is removed by appropriate modification of the TO and FROM links 66b and 66a of previous and subsequent, respectively, ones of entries 64.1–64.y in table 62. After task 108, RTC 32 proceeds to task 98b where the text file is erased and program flow is routed back to the top of the try-again loop at task 100. In task 104, RTC 32 selects another one of PPDB records 72.1–72.z in accordance with PPDB index data item 66e contained in the one of try-again table entries 64.1–64.y which was identified by TO link 66b from the previous one of entries 64.1–64.y. As discussed above, processing remains in the try-again loop until all of entries 64.1–64.y have been removed from try-again table 62. Such removals occur either when a successful call is placed or when the number of attempted calls exceeds a predetermined number.

In summary, the present invention provides a receipt generator which generates a written receipt for the use of a charge-card activated system at a location which is remote from where the system is used. In addition, receipt generator 10 (see FIG. 1) of the present invention provides such a written receipt soon after the customer's use of the system. For example, in the preferred embodiment, a written receipt is provided within 48 hours after the customer's use of the system. Still further, receipt generator 10 of the present invention incorporates the use of a conventional, charge-card activated system, such as an in-flight telephone service system, which need not be significantly modified for the implementation of receipt generator 10. Still further, receipt generator 10 of the present invention allows the use of remote terminals which do not include printing devices.

The present invention has been described above with reference to a preferred embodiment. However, those skilled in the art will recognize that changes and modifications may be made in this preferred embodiment without departing from the scope of the present invention. For example, those skilled in the art will recognize that charge-card activated systems other than the above-discussed system 11 (see FIG. 1) may be utilized in connection with receipt generator 10. In addition, those skilled in the art will recognize that the data files, databases, and tables utilized in the present invention are presented merely as examples of one specific embodiment, and that alternate data configurations, orders, or formats may be adapted for use in connection with the present invention. Moreover, those skilled in the art will recognize that the various tasks and procedures performed by receipt generator 10 of the present invention may be significantly altered in order to achieve the same functions. Furthermore, receipt generator 10 could utilize conventional printers rather than facsimile machines for the generation of written receipts. These and other changes and modifications which are obvious to those skilled in the art are intended to be included within the scope of the present invention.

What is claimed is:

1. A method for initiating the generation of a customer receipt at a selected location in response to customer use of a charge card activated system comprising the steps of storing in a computer a personal profile data base file for each customer including charge card data fields and target address data fields which include selected locations for generating customer receipts, storing in said computer a billing file for each customer including charge card data fields and transaction data fields in response to use of the charge card activated system, for each charge card data field in each of the billing file and the personal profile data base file there existing a corresponding transaction data field in the transaction data fields and a corresponding target address data field in the target address data fields that is used when a respective charge card data field in a billing file and a respective charge card data field in a personal profile data base file are matched, comparing in the computer the billing file for a using customer with the personal profile data base files to identify matching charge card data fields for the using customer in the personal profile data base files and the billing files, upon identification of such matching charge card data fields, generating and sending from the computer a first signal to a location indicated by said corresponding target address data field for a selected location for initiation of generation of the using customer's receipt, and generating and sending from the computer a second signal, representative of said corresponding transaction data field, to initiate generation of the receipt for the using customer at the selected location.

2. The method of claim 1 further including the steps of verifying in the computer the receipt of the first signal at the selected location, and initiating in the computer a retry operation for retransmission of the first signal in the event verification does not occur.

3. The method of claim 2 further including means for initiating a third signal in the computer for initiating the generation of a receipt at another location in the event that verification is not successful after a predetermined number of the retry operations.

4. The method for generating receipts at respective electronic signal receiving receipt generating equipment at respective customer locations in response to customer usage of a charge card activated system comprising the steps of storing a personal profile database which includes identifying information comprising charge-card identifiers, and target address data fields of each customer;

storing billing file information covering a preceding predetermined period of time, said billing file information comprising charge-card identifiers, and call records, for each customer who has used said charge card activated system during said preceding predetermined period of time;

processing said personal profile database and said billing file information to match the personal profile database charge card identifier of a respective using customer with the billing file information charge card identifier of said respective using customer;

generating, in response to said processing, groups of sequential electronic signals, each respective group being representative of matched charge card identifiers of a respective using customer who has used said charge card activated system during said preceding period of time and call records of said using customer;

transmitting each respective group of sequential electronic signals to respective electronic receiving receipt generating equipment located at each respective using customer's location indicated by a target address data field of said target address data fields to initiate generation of said receipt; and generating a receipt in response to receipt of said sequential electronic signals at said respective electronic receiving receipt generating equipment.

5. The method of claim 4 which further comprises the step of re-transmitting any respective group of sequential electronic signals which has not been successfully transmitted to initiate receipt generation.

6. The method of claim 5, wherein the step of retransmitting is repeated for any respective group of sequential electronic signals which has not been successfully transmitted until successfully transmitted.

7. The method of claim 4 wherein said respective electronic signal receiving receipt generating equipment comprises a facsimile machine.

8. The method of claim 4 wherein said respective electronic signal receiving receipt generating equipment comprises a printing device.

9. The method of claim 5, wherein the step of retransmitting is repeated a predetermined number of attempts.

* * * * *